US009403273B2

(12) United States Patent
Payton et al.

(10) Patent No.: US 9,403,273 B2
(45) Date of Patent: Aug. 2, 2016

(54) RAPID ROBOTIC IMITATION LEARNING OF FORCE-TORQUE TASKS

(71) Applicant: GM GLOBAL TECHNOLOGY OPERATIONS LLC, Detroit, MI (US)

(72) Inventors: David W. Payton, Calabasas, CA (US); Ryan M. Uhlenbrock, Los Angeles, CA (US); Li Yang Ku, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 14/285,867

(22) Filed: May 23, 2014

(65) Prior Publication Data

US 2015/0336268 A1    Nov. 26, 2015

(51) Int. Cl.
*B25J 9/16* (2006.01)
*G05B 19/423* (2006.01)

(52) U.S. Cl.
CPC ............... *B25J 9/163* (2013.01); *B25J 9/1664* (2013.01); *G05B 19/423* (2013.01); *G05B 2219/36442* (2013.01); *Y10S 901/03* (2013.01)

(58) Field of Classification Search
CPC ........ B25J 9/163; B25J 9/1633; B25J 9/1664; B25J 9/1656; B25J 9/1628
See application file for complete search history.

(56) References Cited

U.S. PATENT DOCUMENTS

| | | | |
|---|---|---|---|
| 4,860,215 A * | 8/1989 | Seraji | G05B 19/4163 700/260 |
| 2006/0178778 A1 * | 8/2006 | Fuhlbrigge | B25J 9/1656 700/264 |
| 2009/0259412 A1 * | 10/2009 | Brogardh | B25J 9/1633 702/41 |
| 2010/0139437 A1 * | 6/2010 | Ichikawa | B25J 9/1612 74/490.05 |
| 2011/0208355 A1 * | 8/2011 | Tsusaka | B25J 9/1664 700/246 |
| 2013/0245824 A1 | 9/2013 | Barajas et al. | |
| 2014/0343567 A1 * | 11/2014 | Morash | A61B 19/2203 606/130 |

FOREIGN PATENT DOCUMENTS

| | | |
|---|---|---|
| DE | 102006061752 A1 | 7/2008 |
| DE | 102008062622 A1 | 6/2010 |
| DE | 102010019640 A1 | 11/2011 |
| DE | 102012009010 A1 | 12/2012 |
| DE | 102011079117 A1 | 1/2013 |

* cited by examiner

*Primary Examiner* — James Trammell
*Assistant Examiner* — Adam Mott
(74) *Attorney, Agent, or Firm* — Quinn Law Group, PLLC

(57) ABSTRACT

A method of training a robot to autonomously execute a robotic task includes moving an end effector through multiple states of a predetermined robotic task to demonstrate the task to the robot in a set of n training demonstrations. The method includes measuring training data, including at least the linear force and the torque via a force-torque sensor while moving the end effector through the multiple states. Key features are extracted from the training data, which is segmented into a time sequence of control primitives. Transitions between adjacent segments of the time sequence are identified. During autonomous execution of the same task, a controller detects the transitions and automatically switches between control modes. A robotic system includes a robot, force-torque sensor, and a controller programmed to execute the method.

15 Claims, 3 Drawing Sheets

RAPID ROBOTIC IMITATION LEARNING OF FORCE-TORQUE TASKS

TECHNICAL FIELD

The present disclosure relates to rapid robotic imitation learning of force-torque tasks.

BACKGROUND

Robots are electro-mechanical devices that are able to manipulate objects using a series of robotic links. The robotic links are interconnected by joints, each of which may be independently or interdependently driven by one or more actuators. Each robotic joint represents an independent control variable or degree of freedom. End effectors are end links that directly perform a task such as grasping a work tool or stacking parts. Typically, robots are controlled to a desired target value via closed-loop force, impedance, or position-based control laws.

In manufacturing, there exists a drive for more flexible factories and processes that are able to produce new or more varied products with a minimum amount of downtime. To accomplish this goal, robotic platforms should be able to quickly adapt themselves to new tasks without the need for time consuming reprogramming and compilation. Task demonstration, also referred to as imitation learning, is an evolving approach for achieving such performance flexibility. However, existing task demonstration-based training methods may be less than optimal in terms of the required number of training demonstrations and overall statistical computation workload.

SUMMARY

A robotic system and associated control method are disclosed herein. The system and method are intended to improve upon existing human-assisted task demonstration approaches in which a human operator physically demonstrates a task to the robot, for instance via a manual or automatically commanded movement of the robot through particular trajectories, stop positions, and end effector motion. The present approach enables a robot within the robotic system to acquire a primitive set of task knowledge from a small set of demonstrations of a given task, where the demonstrated task specifically requires application of linear and rotational forces/torques in order to realize a desired end result. Specifically, the preset approach helps to enable the analysis of robotic data, typically from no more than two or three total task demonstrations, in order to determine a useful set of invariant task features. The invariant task features are then used to guide future actions of the robot through autonomous execution of the same task through a wide range of variable conditions.

An embodiment of the control architecture provided by the controller of the present invention includes two main task modules, i.e., a Training Phase Module (TPM) and an Execution Phase Module (EPM), which effectively divides the overall process into separate training and execution (post-training) phases. The term "module" as used herein is used in the context of the computer arts to mean all requisite hardware such as processors, data buses, memory devices, input/output (IO) devices, and all other necessary associated hardware, as well as any underlying software programming instructions, the execution of which ultimately causes the controller and the robot to function in the manner described below.

Within the disclosed control architecture, the TPM allows a user to supply a small number of example task demonstrations, such as just 1-3 task demonstrations. Linear force-torque sensors of the robot, which may be connected to or embedded in a wrist or other suitable structure of the robot, and optional environmental sensors located within the robot's work environment, collect robotic performance data during the demonstrated task(s). From the task demonstrations, the controller determines the position and orientation of an end effector of the robot through the range of motion of the end effector relative to objects located in the task demonstration environment. The controller also processes data from the force-torque sensors. The combined set of collected data, which is referred to herein as a training data set, can be temporarily recorded in memory.

Using the collected training data set, the controller next performs a time segmentation process in which a processor of the controller divides a time sequence of the task demonstrations into distinct task segments. That is, the time sequence is analyzed via logic of the controller to identify certain transition events between the segments. This function may be accomplished within an Event Descriptor Trainer Module (EDTM) of the controller. The task segments may be analyzed to identify characteristic event descriptors as explained below, which are later used by the controller to detect the same or similar transitions in an actual autonomous execution of the task by the robot.

The EPM, which is the second main control module of the present controller responsible for task execution, applies a trained sequence of control primitives, i.e., basic control actions such as moving an end effector toward or along a target surface, after the demonstrated/imitative learning of the task. The EPM also applies learned parameters during execution of the task and matches features in runtime data to the learned features so as to determine precisely when to transition between different control regimes, with "control regime" referring to the specific necessary control commands needed for achieving a given action in a corresponding task segment. The various concepts and terms noted above will be explained in detail below with reference to the various Figures.

A benefit of the disclosed invention is enablement of rapid learning of robotic tasks involving both linear and rotational force goals, hereinafter force and torque goals, from just a few simple task demonstrations. In previous training-based methods, force and torque goals may be learned only through time consuming statistical procedures that require hundreds of training examples to produce statistically relevant data. From the standpoint of a factory application, the present invention may provide advantages over such statistical methods.

The present invention may also provide advantages over other imitation learning approaches that are exclusively based on achieving position goals of an end effector. By including linear force and torque goals, the present approach provides robotic capabilities where the successful completion of a given work task is more dependent upon detecting actual tactile cues then on achieving particular physical end effector positions or orientations. Example work tasks where this advantage may be particularly beneficial include, for instance, grasping and inserting a light bulb or other component into a socket, or securing a part that uses a snap-fit connection. The light bulb example is used herein for illustrative simplicity and consistency.

The above features and advantages and other features and advantages of the present invention are readily apparent from the following detailed description of the best modes for carrying out the invention when taken in connection with the accompanying drawings.

DETAILED DESCRIPTION

Figure 1:
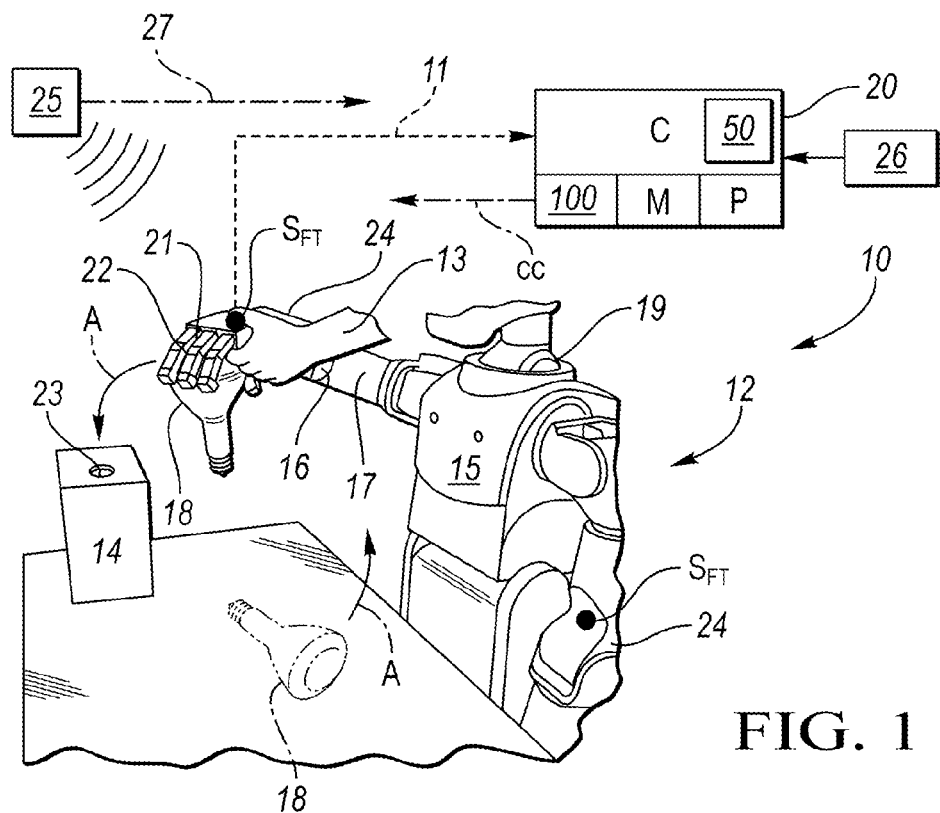
FIG. 1 is a schematic illustration of a robotic system having a robot and a controller used to train the robot via a limited number of force and torque task demonstrations.

With reference to the drawings, wherein like reference numbers refer to the same or similar components throughout the several views, an example robotic system 10 is shown in FIG. 1. The robotic system 10 includes a robot 12 and a controller (C) 20 that is programmed to execute a method 100, and to thereby train the robot 12, via human-assisted task demonstration, in the execution of a force-torque task. The robot 12 may include a torso 15, an arm 16 having an end effector 21, and possibly a head 19 in an example humanoid embodiment. The end effector 21 may be configured as any suitable device for the executing the demonstrated task, e.g., a gripper or a humanoid hand having fingers 22 attached to a wrist 24 or other arm segment 17 as shown. The fingers 22 in such an embodiment may be motor-driven phalanges, extensions, or other grippers.

A non-limiting example force-torque work task, which will be used hereinafter for illustrative simplicity and consistency, is the grasping of an object 18 in the form of a light bulb. However, any number of other force-torque tasks could be used within the scope of the invention. A human operator 13, whose arm alone is shown in FIG. 1 for illustrative simplicity, can demonstrate a new force-torque work task to the robot 12 simply by demonstrating the task. For instance, in the example shown in FIG. 1, the operator 13 manually guides the robot 12 through the grasping and inserting of the light bulb into a fixture 14 in the form of a socket, as indicated by the trajectory of arrows A.

Linear forces and torques, i.e., rotational forces, applied by the robot 12 via the operator 13 are measured during task demonstration by one or more force-torque sensors ($S_{FT}$) positioned at or near the robot's end effector 21, such as embedded within a wrist 24. Task demonstration by backdriving the robot 12 in this manner allows the operator 13 to feel and apply appropriate forces and torques in the demonstration of the task, such as the grasping, rotation, and placement of the object 18 with respect to the fixture 14, e.g., insertion of the object 18 into a socket 23 of the fixture 14. That is, the operator 13 grasps the wrist 24 behind a given force-torque sensor ($S_{FT}$) so that the force-torque sensor ($S_{FT}$) can detect the same forces as the operator 13. Also, it is possible for the operator 13 to teleoperate the robot 12, in which case the operator 13 observes rather than feels the forces, e.g., on various displays or readouts provided in software.

The controller 20 of FIG. 1 includes a Logic Module 50 that includes two main control modules: a Training Phase Module (TPM) and an Execution Phase Module (EPM). The TPM and EPM are described in detail below with reference to FIG. 5. In general, the Logic Module 50 proceeds in two distinct phases of operation, i.e., a task training phase (Phase I) and a task execution phase (Phase II). During the task training phase, the operator 13 provides a relatively small number of example task demonstrations of a desired task, with the term "small" as used herein meaning a total of no more than five task demonstrations in one embodiment, with no more than two or three demonstrations being sufficient in most instances.

From this relatively limited number of training examples, the controller 20 captures the force-torque signals (arrow 11) from the force and torque sensors $S_{FT}$ as well as pertinent details of the position and orientation of the end effector 21, e.g., via performance data (arrow 27). The performance data (arrow 27) is collected by and output from one or more additional sensors 25, such as joint angle sensors, vision system sensors, point cloud cameras, and/or the like. The performance data (arrow 27) may include data tracking of the movement of the end effector 21 relative to the object 18. The combined set of collected data during task demonstration is referred to herein as the training data set (arrow 11T).

Figure 5:
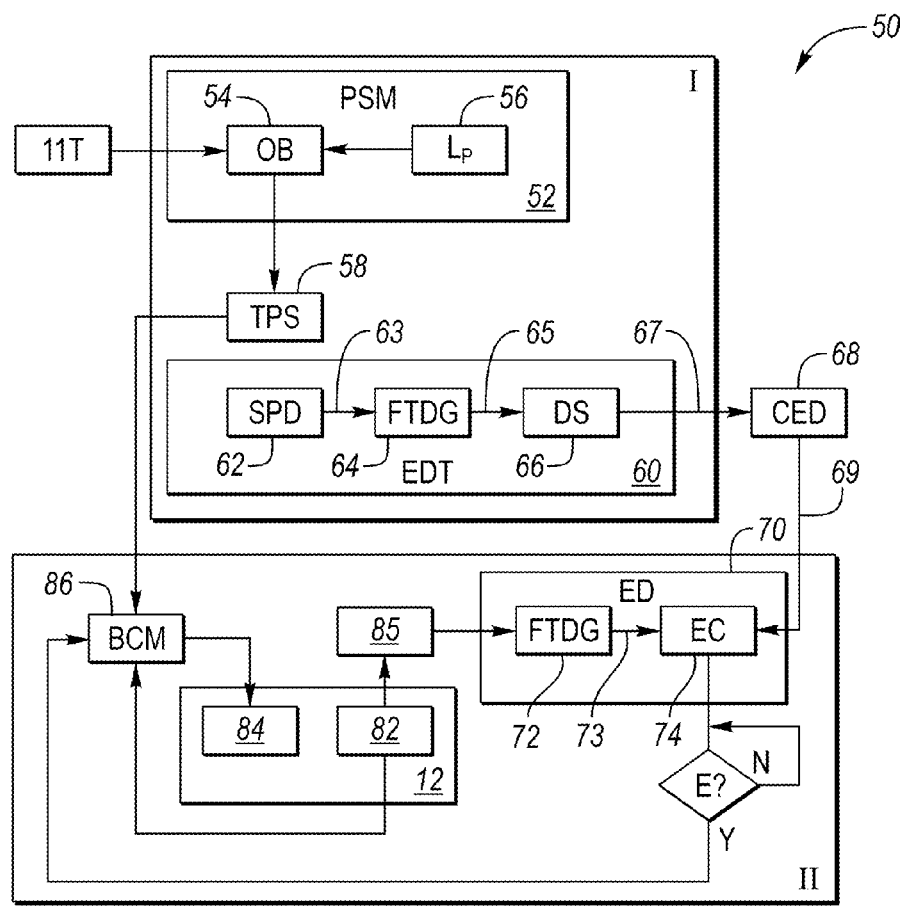
FIG. 5 is a schematic diagram of a system architecture for the controller shown in FIG. 1.

Referring briefly to FIG. 5, the Force-Torque Logic Module 50 includes the Training Phase (Phase I) and the Execution Phase (Phase II) noted above. The controller 20 of FIG. 1 receives the training data set 11T and performs a segmentation operation on the received training data set 11T via a Primitive Segmentation Module (PSM) 52. Such an operation may include dividing a time-sequence of the demonstrated task into distinct segments of activity, where each resultant segment corresponds to a single control mode or "task primitive" of the robot 12 shown in FIG. 1.

Figure 3:
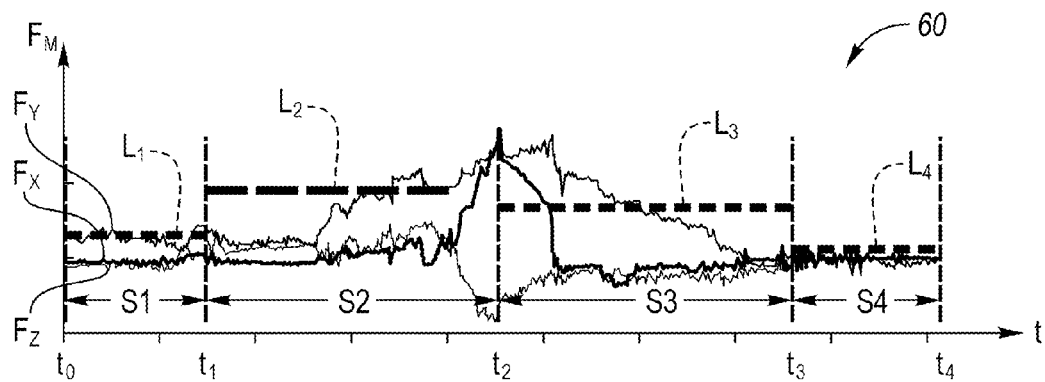
FIG. 3 is a time plot of example training data in the form of example force measurements of the robot shown in FIG. 1, with force depicted on the vertical axis and time on the horizontal axis, and with the training data segmented and classified into a sequence of control primitives.

Referring briefly to FIG. 3, an example of such segmentation is provided. The magnitudes ($F_M$) of a given task demonstration is plotted in its three dimensions as example measured force components $F_X$, $F_Y$, and $F_Z$, with the measured force components plotted against time (t) to produce a time sequence 48 of the demonstrated task. Other demonstration data may include position, orientation, torque, and joint angles of the robot 12 and/or its end effector 21. For simplicity of illustration, only force is shown in the example of FIG. 3.

Segmentation may result in task segments S1, S2, S3, and S4. Threshold changes in measured force, for instance, can be used by the controller to distinguish the transitions between the segments S1 and S2, S2 and S3, and S3 and S4, e.g., as occurs at $t_1$, $t_2$, and $t_3$, with the entire demonstrated task spanning the duration $t_0$-$t_4$. Lines $L_1$, $L_2$, $L_3$, and $L_4$ indicate the relative levels of force in each of the segments S1-S4, e.g., rolling averages of the X, Y, and Z components. While force is shown in the example of FIG. 3, the controller 20 of FIG. 1 may perform a similar operation on values such as position, orientation, and torque.

Referring again to FIG. 5, after having determined the segments of activity as in FIG. 3, which collectively define a task primitive sequence (TPS) 58, the controller 20 of FIG. 1 next analyzes these segments to identify transition events between the segments, e.g., the vertical lines in FIG. 3 at $t_1$, $t_2$, and $t_3$. This may be accomplished within an Event Descriptor Trainer (EDT) 60, e.g., a computer module that processes the segments to derive a set of characteristic event descriptors (CED) 68. The characteristic event descriptors 68 are later used by the controller 20 to detect transitions between control modes or segments in an actual execution of a previously demonstrated task during the task execution phase (Phase II).

The remaining structure and details of operation of the Logic Module 50 of FIG. 5 are discussed later below. That description begins with a description of the processing of the training data set 11T within the task training phase (Phase I), and then describes the use of the resulting task primitive sequences 58 in building characteristic event descriptors 68 so as to allow the robot 12 of FIG. 1 to execute a previously-demonstrated force-torque task.

Referring again to FIG. 1, the controller 20 may include any required hardware and process instructions suitable for executing the present method 100, and for outputting control signals (arrow CC) to the robot 12 as needed, for instance a command to execute an autonomous task such as grasping and inserting the object 18 into the socket 23 as previously demonstrated by the operator 13. The controller 20 may be embodied as one or multiple digital computers or host machines each having one or more processors (P) and memory (M), i.e., tangible, non-transitory memory such as optical or magnetic read only memory (ROM), as well as random access memory (RAM), electrically-programmable read only memory (EPROM), etc.

The controller 20 may also include a high-speed clock, analog-to-digital (A/D) circuitry, digital-to-analog (D/A) circuitry, and any required input/output (I/O) circuitry, I/O devices, communication interfaces, signal conditioning and buffer electronics, and the like. An input device 26 may be separate from or integrated with the controller 20. The input device 26 may be a mouse, joystick, or other control device suitable for teleoperating the robot 12 through a human-demonstrated task during the task training phase (Phase I) of FIG. 5.

Task Demonstration

Figure 2:
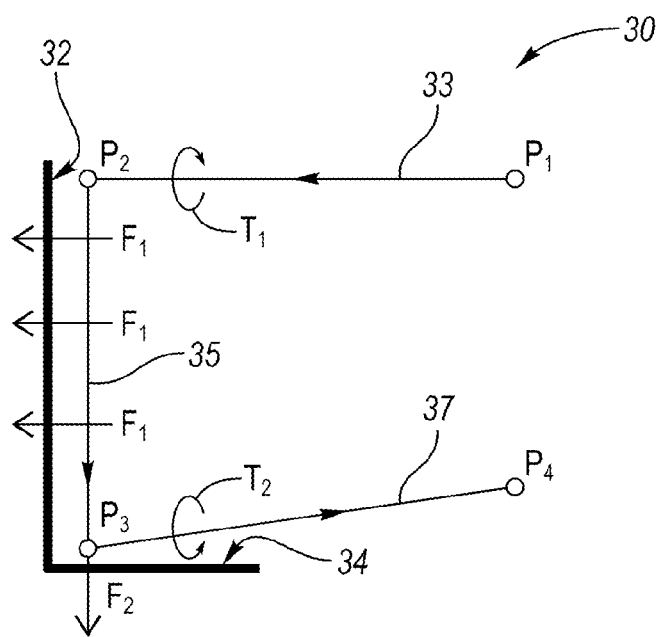
FIG. 2 is a schematic illustration of an example force-torque task with learned control primitives.

Referring to FIG. 2, an example primitive sequence 30 illustrates a basic training example. Task demonstration data is recorded by the controller 20 while the operator 13 of FIG. 1 performs a task in conjunction with the robot 12, either by backdriving the robot 12 manually, by tele-operating the robot 12 via input signals from the input device 26, or both. The state of the robot 12 of FIG. 1, including a position of the end effector 21, its orientation, gripper/tool state, and force/torque sensor signals (arrow 11), is recorded periodically in memory M.

For example, in FIG. 2 the robot 12 of FIG. 1 may start out at a first point $P_1$, and then move linearly to a second point $P_2$ via an approach trajectory 33 until the end effector 21 of FIG. 1 contacts a first surface 32 at the second point $P_2$, e.g., a point on a wall. At the second point $P_2$, the end effector 21 may be pressed against the first surface 32 with a force $F_1$, and possibly rotated about the second point $P_2$ with a torque $T_1$, which is collected in the same manner as the force $F_1$.

Next, the operator 13 of FIG. 1 may slide the end effector 21 from the second point $P_2$ along the first surface 32 with a movement trajectory 35 to a third point $P_3$. The end effector 21 may apply a force $F_2$ until contact is made with a second surface 34, for instance a floor. The end effector 21 of FIG. 1 may possibly rotate about the third point $P_3$ with a second torque $T_2$, and move thereafter via a departure trajectory 37 to a fourth point $P_4$ to thereby complete the example task primitive sequence 30. The demonstrated task primitive sequence 30 of FIG. 2 is merely illustrative. Those of ordinary skill in the art will appreciate that other combinations of force-torque tasks may be demonstrated in a similar manner.

Primitive Library

Referring again to FIG. 5, the term "behavior primitive" as used herein describes a relatively simple robotic action. Behavior primitives depend on a number of control parameters that can be performed by the robot 12 of FIG. 1. There can be more than one type of behavior primitive, which may be chosen from a primitive library ($L_p$) 56 of available task primitives. Each task primitive type may have the following properties: (1) an associated robot controller, such as the controller 20 of FIG. 1, that is capable of executing the task primitive, (2) logic for adapting control parameters to "best-fit" a given time segment of task demonstration data, and (3) logic for evaluating the relative cost or error between the best-fit control parameters of property (2) and a segment of the demonstration data, with example task segments S1-S4 shown in FIG. 3.

In a particular embodiment, the controller 20 of FIG. 1 may use a primitive library 56 of three different primitive types: free movement, constraint force movement, and goal force movement. Each of these example primitive types will now be described in turn.

Free Movement

The term "free movement" refers to position-based movement that is not dependent on force-torque sensing, e.g., movement in FIG. 2 from the first point $P_1$ to the second point $P_2$. Free movement includes control of the end effector 21 of FIG. 1 from a starting position and orientation to a target position and orientation, for instance via linear interpolation of the position and quaternion interpolation of the orientation.

The controller 20 of the present invention may extract the position and orientation parameters from the first and last time step of a given time segment, creating lines $l_p$ in three-dimensional (3D) Cartesian space and $l_r$ in 3D roll-pitch-yaw space. The cost over a segment of n time steps may be calculated as follows:

$$\text{cost}(prim) = \sum_{i=1}^{n} \alpha \|P_{rlp\perp}(pos_i)\| + \beta \|P_{rlp\perp}(rot_i)\| + \gamma \|force_i\|$$

which is the total geometric error between the collected data and the linear approximation, plus a calibrated penalty for any observed force.

Constraint Force Movement

The term "constraint force movement" refers to a hybrid force-position value that has one direction along which to move and another direction in which to maintain a constant constraint force. This is an appropriate primitive for imitating sliding or dragging behaviors along surfaces, such as the motion that occurs between second and third points $P_2$ and $P_3$ in FIG. 2 along the surface 32. Position and orientation parameters are extracted for this primitive in the same manner as occurs in the free movement parameter. Constraints are also extracted for a constraint force vector $f_c$ as the average magnitude and direction of force observed during the segment. A cost is thus determined over a segment of n time steps, e.g., as follows:

$$\text{cost}(prim) = \sum_{i=1}^{n} \alpha \|P_{rlp\perp}(pos_i)\| +$$
$$\beta \|P_{rlp\perp}(rot_i)\| + \gamma \|force_i - f_c\| + \delta 1(\|force_i\| \le f_{thresh})$$

which is the total geometric error between the position and orientation and their linear approximations, plus the deviation from the constraints force, plus a penalty when the force magnitude is below a threshold ($f_{thresh}$).

Goal Force Movement

The term "goal force movement" is used herein for another primitive that is a hybrid force-position value that describes movement until a goal force is maintained. This primitive is suitable for imitating insertion or contact behaviors. The controller 20 of FIG. 1 extracts position and orientation parameters in the same way as the free movement parameter described above, and also extracts the goal force as the average force observed during the end of a movement, specifically when the end effector 21 of FIG. 1 is positioned within a distance threshold of the end position. The cost of moving over a segment of n time steps may be calculated as follows:

$$\sum_{i=1}^{n} \alpha \|P_{rlp\perp}(pos_i)\| + \beta \|P_{rlp\perp}(rot_i)\| +$$
$$\gamma \|force_i - f_c\| \cdot 1(\|pos_i - pos_n\| \leq pos_{thresh}) +$$
$$\delta(\|force_i\| \cdot 1(\|pos_i - pos_n\| > pos_{thresh})$$

which is the total geometric error between the position and orientation and their linear approximations plus the deviation from the goal force during the end of the movement plus a penalty for any force before the end of the movement.

Optimization

In FIG. 5, in the Training Phase (Phase I) the controller 20 uses an optimization block (OB) 54. At this stage of logic, the controller 20 analyzes the demonstration data of a given task and produces the task primitive sequence (TPS) 58, i.e., the behavior primitives that are going to be used to imitate and further analyze the demonstrated task. The controller 20, via the TPS 58, finds a sequence of primitives that best-fit the task demonstration data, and may optimize this sequence of primitives over the total number of primitives, their types, when in time the primitives begin and end, and each of their control parameters.

One possible approach for the optimization block 54 is a variant of iterated hill climbing optimization, a process that is well known in the art. Each round of hill climbing in such an approach starts from a randomly generated sequence of primitives and transition times. At each iteration, the controller 20 of FIG. 1 applies a discrete number of modifications to the solution, evaluates the cost of each modified solution, and replaces the solution with the lowest-cost modification. Some of the modifications may depend on a scale factor, which can be increased when a local minimum is detected to find a better sequence. The hill climbing stops when the local minimum is found at the maximum scale factor. A few rounds of hill climbing are performed from different random initializations to find an overall minimum.

The cost of a sequence S with i task primitives over N segments may calculated as follows:

$$\text{cost}(S) = \sum_{i=1}^{N} \text{cost}(prim_i, seg_i) + \alpha N$$

where α is used to favor sequences with fewer steps over a more complex sequence with many steps. The modifications that can be performed on a sequence during optimization are a shift in transition time between two primitives forward or backward by x time steps where x is a scale factor, a merge of two adjacent primitives into one primitive covering both segments, a split of one segment into two smaller segments, or a swap of one primitive type for another.

Figures 4A, 4B:
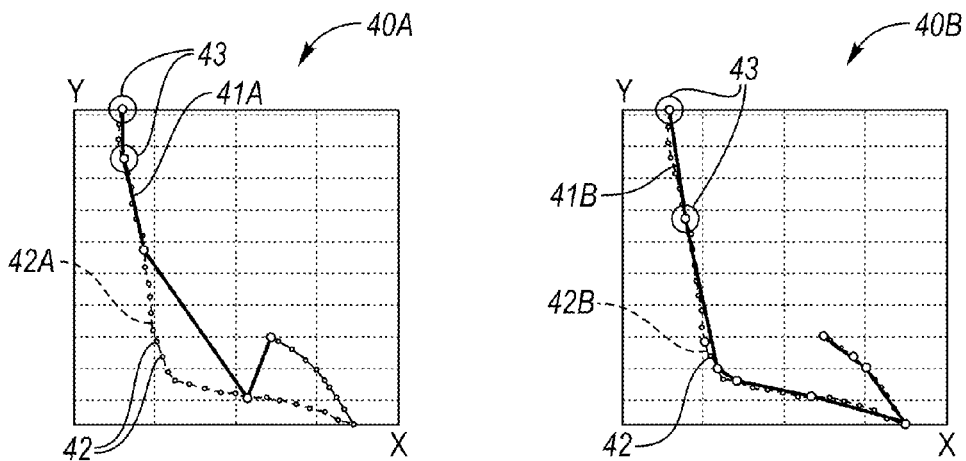
FIGS. 4A-C collectively depict individual schematic trajectories of an end effector of the robot shown in FIG. 1 according to three possible scenarios.
Figure 4C:
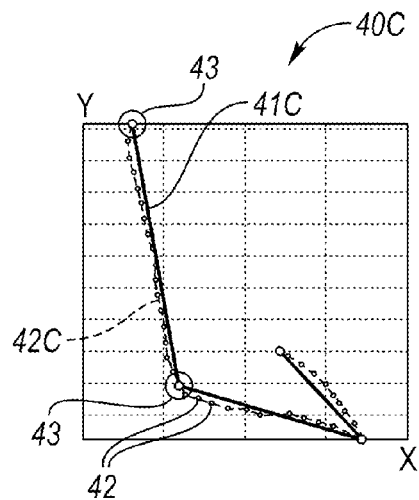

Referring briefly to FIGS. 4A-C, several possible segmentations are illustrated for a given simplified two-dimensional task demonstration, with the X and Y dimensions plotted on the respective horizontal and vertical axes. The effects of optimization as set forth above are illustrated in FIG. 4C. Line 42A shows the trajectory of the end effector 21 position in free space during the example light bulb insertion task of FIG. 1. Line 41A shows the primitive sequence, with the transitions between task primitives marked by point 43. FIG. 4A shows a randomly-initialized primitive sequence that is a relatively poor match for the demonstration data. FIG. 4B shows another random sequence which better matches the task demonstration, but which uses many unnecessary primitives. FIG. 4C shows an optimized segmentation produced by the optimization block 54 of FIG. 5, which more closely matches the training data and uses a smaller number of primitives.

Event Descriptor Trainer

Referring again to FIG. 5, the event descriptor trainer (EDT) 60 represents the force-work information when an event has occurred, and to detect meaningful force-torque events that should lead to a change in action of the robot 12. Since, as described above, the demonstrated task is segmented into different movement primitives at different stages of the task, it is important to find characteristic tactile events that occur just before these transitions must take place. These events then become the signals that can trigger transitions between movement primitives when a task is being executed. The event descriptor trainer 60 in an example embodiment may be composed of three parts: (1) a salient point detector (SPD) 62, (2) a force-torque descriptor generator (FTDG) 64, and (3) a descriptor selector (DS) 66.

The salient point detector 62 finds time points in the training data set 11T where an event is more likely to occur, and marks this point as a salient point. The force-torque descriptor generator 64 then receives this information 63 and generates a force-torque descriptor 65 for each salient point. The force-torque descriptor generator 64 may operate by mapping the force-torque data of a salient point into a different coordinate frame that better distinguishes different events.

The descriptor selector 66 then groups similar force-torque descriptors 65 among all training example and outputs groups of salient point force-torque descriptors 67. Each group may be given a score. The group that is most likely to be composed of salient points at the event is then selected by the controller 20. The characteristic event descriptor (CED) 68 is then generated from the salient point force-torque descriptors 67. The details of each of these elements will now be described in turn.

Salient Point Detector

The salient point detector 62 in Phase I of FIG. 5 operates by finding time points in the training data set 11T where an event is more likely to occur. These time points are marked as salient points in logic of the controller 20. The more time points that are marked as a salient points, the longer the required training time. For instance, the robotic system 10 of FIG. 1 may use the following equation to mark salient points from the raw force-torque data $D_i$ collected from a given sensor (i):

$$\text{Salient}(t) = \begin{cases} \text{true,} & \text{if } \exists \text{ } i\text{: } \Delta D_i(t+1) \cdot \Delta D_i(t) \le 0 \\ \text{false,} & \text{otherwise} \end{cases}$$

The above equation marks salient points at time point t where the force or torque value in either dimension forms a peak or a nadir. The salient point detector 62 of FIG. 5 essentially works as a type of first stage filter that filters out time points of "not possible to have" events.

Force-Torque Descriptor Generator

The force-torque descriptor generator 64 generates the force-torque descriptors 65 for each salient point detected by the salient point detector 62. To generate a force-torque descriptor 65, a section of the raw force-torque data collected in FIG. 1 is first extracted using a fixed time window with a length L centered at a salient point s. The segmented raw data W(s) is an L×K matrix, where K is the number of sensors used. The F-T descriptors 65 are then created by transforming the segmented raw data W(s) for each salient point using the following steps: (1) dimension increase, (2) un-biasing, and (3) coordinate transformation, each of which will now be described in turn.

Dimension Increase: in this optional step, the dimension of the example six-dimension (six-axis) raw data from the robot 12 of FIG. 1 is increased so as to include additional information, such as the force-torque derivatives or the moving direction of the end effector 21. The inclusion of this step may increase the overall robustness of the approach disclosed herein.

Un-biasing: Different force-torque sensors have different offset values, as is known in the art. Un-biased data U(s) may be obtained as follows:

$$U_{lk}(S) = W_{lk}(s) - \frac{\sum_{l=1}^{L} W_{lk}(s)}{L}, \forall l\forall k$$

which subtracts the mean of the segmented raw data $W_{lk}(s)$ for each sensor dimension in the segmented data.

Figure 6:
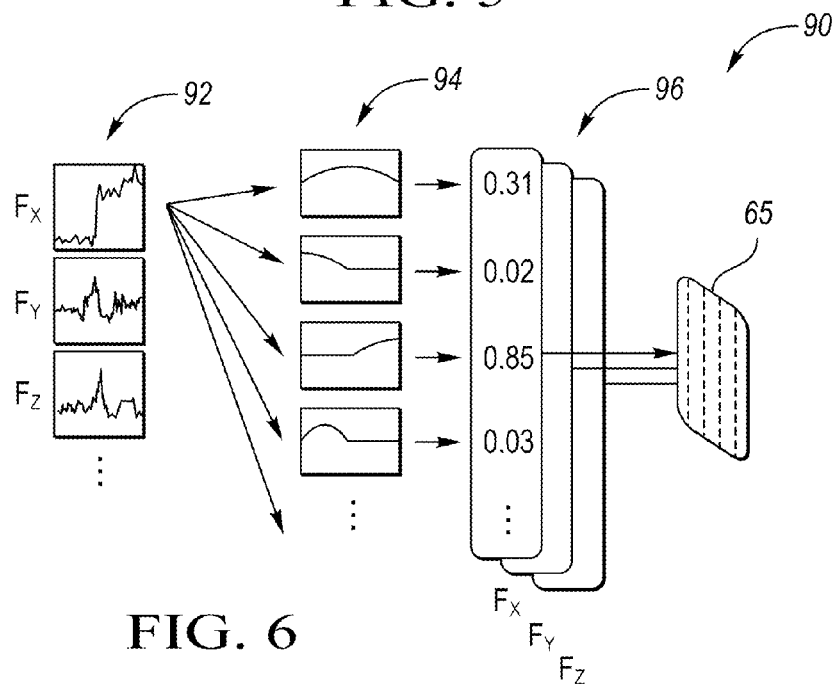
FIG. 6 is a schematic illustration of a coordinate transformation step usable as part of the method disclosed herein.

Coordinate Transformation: referring briefly to the schematic transformation 90 shown in FIG. 6, this step generates the force-torque descriptor 65 by transforming the un-biased raw data U(s) 92, e.g., the collected raw force data for force components $F_X$, $F_Y$, and $F_Z$, to a filter coordinate 96. A filter coordinate 96 uses a calibrated set of filters 94 as an input basis. Each basis $f_r$ in a filter coordinate 96 has the same length as the time window of the raw data. The Haar wavelet set, the Daubechies wavelet set, and a designed non-orthogonal wavelet set are all valid alternatives for this step. A transformation equation may be stated as follows:

$$D(s) = \begin{pmatrix} f_1 \\ f_2 \\ \vdots \\ f_n \end{pmatrix} \cdot U(s)$$

where n is the number of filters used. The data transformed into the filter coordinate is the generated force-torque descriptor 65.

Descriptor Selector: referring again to FIG. 5, the descriptor selector (DS) 66 groups similar force-torque descriptors 65 as generated by the force-torque descriptor generator 64 into multiple sets Gj, j∈J, where J is the total number of sets.

The set that represents the trained event is selected by the controller 20 of FIG. 1 based on a score function and prior knowledge. The event descriptor 68 is then generated from the force-torque descriptors 65 contained in the selected set. Each of these two steps, i.e., grouping of descriptors and descriptor selection, will now be described in turn.

Grouping Descriptors: all of the force-torque descriptors 65 generated by the force-torque descriptor generator 64 of FIG. 5 are automatically regrouped into multiple sets $G_j$. Each set contains one force-torque descriptor 65 from each training example. All possible sets are generated. Each set is then given a similarity score depending on how close these force-torque descriptors 65 are to each other in Euclidean space. An example equation for doing this is stated as follows:

$$\text{similarity score}(G_j) = \frac{1}{\sum_{i=1}^{M}\sum_{k=1}^{M} \|D_i - D_k\|_2}, D_i, D_k \in G_j$$

where M is the number of training examples that are used.

Descriptor Selection: in this step, the event set that represents the trained force-torque events is selected from all the sets generated in prior step. The event set selection is based an event score function, which is a function of the similarity score and a prior score about which point in time an event is more likely to occur.

$$\text{event score} = \text{similarity score}(G_j) \cdot \text{prior score}(G_j)$$

$$\text{prior score}(G_j) = \prod_{D \in G_j} \frac{1}{1 + e^{-\alpha \frac{t_D}{L_D}}}$$

The prior score $G_j$ is the product of sigmoid functions which has a higher probability at the end of the segmented training data. The variable α is a constant, the variable $t_D$ is the time point of the descriptor D, and the variable $L_D$ is the length of the particular training segment containing descriptor $t_D$. The prior function can be substituted with any function that provides additional information. The event descriptor E is then generated by calculating the mean of the descriptors in the set having the highest score, i.e.:

$$E_{ij} = \frac{\sum_{D \in G} D_{ij}}{M}$$

Execution Phase

With reference to Phase II of FIG. 5, the task execution phase, with only two or three training examples the robotic system 10 of FIG. 1 will have obtained enough information to execute the demonstrated task. The execution phase operates by repeating the previously learned sequence of control primitives, and then using learned force-torque constraints and objectives for these primitives. In order to know precisely when to switch from one primitive to the next within the learned sequence, the robotic system 10 also relies upon the ability to detect transition events. From the task training phase (Phase I), event descriptors 69 will have been learned that are specific to each transition, and these event descriptors 69 will allow an event detector (ED) 70, another computer or logic module, to determine when to trigger a behavior control module (BCM) 86, e.g., behavior control logic and hardware of the controller 20, and thereby switch to a new control regime.

The behavior control module 86 is programmed or otherwise configured to manage the execution of actions of the robot 12 of FIG. 1. The behavior control module 86 uses the three control regimes described earlier, i.e., free movement, constraint force movement, and goal force movement, to control actions of the robot 12. Each of these control regimes has its own particular feedback control requirements that are parameterized in the primitive segmentation stage of learning. The switch between primitives is triggered by events from the event detector 70.

Event Detector

The event detector 70 uses the event descriptor 69 generated from the event descriptor trainer 68 of Phase I to detect a specific event in actual/online data. As each event is associated with the trained event descriptor 68, to detect different events, different event descriptors 68 are needed. The event detector 70 in Phase II is composed of two parts: another force-torque descriptor generator (FTDG) 72 different from that shown at 64 of Phase I, and an event classifier (EC) 74. The force-torque descriptor generator 72 generates a force-torque descriptor 73 for the online/runtime data. The event classifier 74 then classifies whether the force-torque descriptor 73 from the online data is the particular event previously trained by the event descriptor trainer 60 in Phase I.

Force-Torque Descriptor Generator

The force-torque descriptor generator 72 of Phase II generates the force-torque descriptor 73 from the online data 85, e.g., from the sensors $S_{FT}$ and 25 of FIG. 1, which are collectively indicated in FIG. 5 as sensor suite 82. The online data 85 is set to have a time length equal to the length of the time window used in the event descriptor trainer 60. The force-torque descriptor 72 is generated by applying the same three steps in the force-torque descriptor generator 64 of the event descriptor trainer 60 in Phase I, i.e., dimension increase, un-biasing, and coordinate transformation as explained above.

Event Classifier

The event classifier 74 in Phase II classifies whether the online data 85 is the same data as the event descriptor E, i.e., the event descriptor 69 output from Phase I by the characteristic event descriptor 68. This may be achieved as follows: (1) a scoring function may be used to calculate the possibility that the online data represents an event. The scoring function may use the Euclidean distance between the force-torque descriptor 65 ($D_T$) as generated by the force-torque descriptor generator 64 and the event descriptor E:

$$\text{Scoring function} = \frac{1}{\|D_T - E\|_2}$$

(2) If the output of the scoring function above exceeds a calibrated classification threshold, the online data is classified as an event, which occurs at a decision block 75 in FIG. 5.

The classification threshold may be learned by the controller 20 via "leave one out cross validating" of the training data using both the event descriptor trainer 60 and the event detector 70. The value that gives the least number of false positives is then selected as the classification threshold. The robot 12, by commanding actions from its actuators 84 via the control signals (arrow CC) of FIG. 1, then moves through the various necessary trajectories for accomplishing the commanded previously-learned task. Thus, the overall task is represented as a sequence of motion segments defined by parameterized primitives annotated with characteristic event descriptors as explained above. On execution, the initial motion segment is performed by invoking the associated control primitive until an event is detected by the event classifier 74. The event must match the event descriptor that corresponds to the end of the current segment. When this event is triggered, the controller 20 automatically switches to the next segment.

Using the above approach, the operator 13 of FIG. 1 is able to demonstrate a task in no more than a few demonstrations, and have the robot 12 learn from that limited number of demonstrations. In doing so, the operator 13 is able to impart task knowledge to the controller 20 without having to be an expert in robotic programming or in robotic control. The system 10 of FIG. 1 and the associated method 100, exemplified via the logic 50 of FIG. 5, may be deployed in a variety of situations that cannot be performed with conventional industrial robotics.

While the best modes for carrying out the invention have been described in detail, those familiar with the art to which this invention relates will recognize various alternative designs and embodiments for practicing the invention within the scope of the appended claims.

The invention claimed is:

1. A method for training a robot to autonomously execute a predetermined robotic task requiring application of a linear force and a torque to an object by an end effector of the robot, the method comprising:
    moving the end effector through multiple states of the predetermined robotic task to thereby demonstrate the predetermined robotic task to the robot in a set of n training demonstrations;
    measuring a set of training data, including measuring at least the linear force and the torque via a force-torque sensor, while moving the end effector through the multiple states of the predetermined robotic task;
    extracting key features from the measured set of training data via a controller, including segmenting the measured set of training data into a time sequence of control primitives and identifying transitions between adjacent segments of the time sequence;
    measuring the linear force and the torque via the force-torque sensor as online/real-time data during a subsequent autonomous execution of the demonstrated robotic task by the robot;
    detecting transitions via the controller during the subsequent autonomous execution of the demonstrated robotic task by the robot; and
    automatically switching between a plurality of different control modes during the subsequent autonomous execution of the demonstrated robotic task in response to the detected transitions.

2. The method of claim 1, wherein moving an end effector includes backdriving the end effector.

3. The method of claim 1, wherein moving an end effector includes commanding the end effector via a user input device.

4. The method of claim 1, wherein n≤5.

5. The method of claim 4, wherein n≤2.

6. The method of claim 1, wherein detecting the transitions includes detecting a transition between each of a position control primitive, a hybrid force control primitive, and a goal force control primitive, and wherein segmenting the measured set of training data into a time sequence of control primitives includes segmenting the measured set of training data into combinations of the position control primitive, the hybrid force control primitive, and the goal force control primitive.

7. The method of claim 1, wherein detecting the transitions includes executing a scoring function via the controller to calculate a probability that a data point in the online/real-time data during the subsequent autonomous execution of the demonstrated robotic task represents one of the transitions.

8. A robotic system comprising:
- a robot having an end effector;
- at least one force-torque sensor positioned with respect to the robot and operable to measure linear and rotational forces applied to an object by the end effector; and
- a controller in communication with the robot and the at least one force-torque sensor, and having a processor and memory on which is recorded instructions for training the robot to autonomously execute a robotic task requiring an application of linear forces and torques to the object by the end effector, wherein the controller is configured to execute the instructions to cause the controller to:
  - record a movement of the end effector through multiple states of the robotic task during a set of n demonstrations of the robotic task;
  - measure a set of training data, including measuring, via the at least one force-torque sensor, a linear force and a torque applied to the object by the robot while the end effector moves through the multiple states;
  - extract key features from the measured set of training data, including segmenting the measured set of training data into a time sequence of control primitives separated and identifying transitions between the segments of the time sequence;
  - measure at least the linear force and the torque via the force-torque sensor as online/real-time data during a subsequent autonomous execution of the demonstrated robotic task by the robot;
  - detect the transitions during the subsequent autonomous execution of the demonstrated robotic task by the robot; and
  - switch between a plurality of different control modes in response to the detected transitions during the subsequent autonomous execution of the demonstrated robotic task.

9. The robotic system of claim 8, wherein the controller is configured to record the movement of the end effector by recording motion imparted by a backdriving of the end effector.

10. The robotic system of claim 8, further comprising a user input device programmed to command the end effector to move during the set of n task demonstrations.

11. The robotic system of claim 8, wherein the robot includes a wrist, and wherein the force-torque sensor is embedded in the wrist.

12. The robotic system of claim 8, wherein the control primitives include a position control primitive, a hybrid force control primitive, and goal force control primitive, and wherein the controller is programmed to detect a corresponding transition between each of the control primitives.

13. The robotic system of claim 8, wherein the controller detects the transitions by executing a scoring function to thereby calculate a probability that a data point in the online/real-time data during the subsequent autonomous execution of the demonstrated task represents one of the transitions.

14. A method for training a robot to autonomously execute a robotic task requiring application of a linear force and a torque to an object by an end effector of the robot, the method comprising:
- backdriving the end effector through multiple states of a predetermined robotic task to thereby demonstrate the predetermined robotic task to the robot in a set of n training demonstrations, wherein n≤3;
- measuring a set of training data, including measuring at least the linear force and the torque via a force-torque sensor embedded in a wrist of the robot, while backdriving the end effector through the multiple states of the predetermined robotic task;
- extracting key features from the measured set of training data via a controller, including segmenting the measured set of training data into a time sequence of control primitives using a rolling average of the measured set of training data and identifying transitions between adjacent segments of the time sequence;
- measuring at least the linear force and the torque via the force-torque sensor as online/real-time data during a subsequent autonomous execution of the demonstrated robotic task by the robot;
- detecting the transitions in the online/real-time data during the subsequent autonomous execution of the demonstrated robotic task by the robot, including detecting a transition between each of a position control primitive, a hybrid force control primitive, and a goal force control primitive; and
- automatically switching between a plurality of different control modes in response to the detected transitions.

15. The method of claim 14, wherein detecting the transitions includes executing a scoring function that calculates a probability that a data point in the online/real-time data represents one of the transitions.

* * * * *